United States Patent
Miura et al.

(10) Patent No.: US 10,663,373 B2
(45) Date of Patent: May 26, 2020

(54) MISFIRE DETECTING DEVICE FOR ENGINE

(71) Applicant: Mazda Motor Corporation, Aki-gun, Hiroshima (JP)

(72) Inventors: Shin Miura, Hiroshima (JP); Akio Saiki, Hiroshima (JP); Hiroshi Okubo, Higashihiroshima (JP); Kuninori Suzuki, Hiroshima (JP); Kenichi Ogasawara, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 238 days.

(21) Appl. No.: 15/975,038

(22) Filed: May 9, 2018

(65) Prior Publication Data

US 2018/0340863 A1 Nov. 29, 2018

(30) Foreign Application Priority Data

May 23, 2017 (JP) ................. 2017-101516

(51) Int. Cl.
*G01M 15/11* (2006.01)
*F02D 41/00* (2006.01)
*F02D 17/02* (2006.01)

(52) U.S. Cl.
CPC ............ *G01M 15/11* (2013.01); *F02D 17/02* (2013.01); *F02D 41/0087* (2013.01); *F02D 2200/1015* (2013.01)

(58) Field of Classification Search
CPC ............ G01M 15/11; F02D 17/00–026; F02D 2200/1015; F02D 41/0087
See application file for complete search history.

(56) References Cited

U.S. PATENT DOCUMENTS

| | | | | |
|---|---|---|---|---|
| 8,281,650 B2* | 10/2012 | Kushihama | ............ | G01M 15/11 73/114.04 |
| 9,506,408 B2* | 11/2016 | Glugla | .................... | F02D 17/02 |
| 10,161,326 B2* | 12/2018 | Glugla | .................... | F02D 17/02 |
| 10,323,714 B2* | 6/2019 | Inoue | ...................... | F16H 45/02 |

FOREIGN PATENT DOCUMENTS

JP 2006132385 A 5/2006

* cited by examiner

*Primary Examiner* — Justin N Olamit
(74) *Attorney, Agent, or Firm* — Alleman Hall Creasman & Tuttle LLP

(57) ABSTRACT

A misfire detecting device for an engine is provided, which includes a processor configured to execute a cylinder operation controlling module to switch an engine operation mode from an all-cylinder operation to a reduced-cylinder operation in which operation of one or some of cylinders are suspended, when an execution condition of the reduced-cylinder operation is satisfied, a misfire detecting module to detect a possibility of misfire occurrence based on an angular speed variation of the engine, and a centrifugal damping part configured to reduce vibration caused by the engine. When a possible misfire state is detected by the misfire detecting module during the reduced-cylinder operation, the cylinder operation controlling module executes an operating-cylinder increase control in which the number of operating cylinders is increased. When the possible misfire state is continuously detected after the operating-cylinder increase control, the misfire detecting module detects the engine misfire.

8 Claims, 8 Drawing Sheets

US 10,663,373 B2

MISFIRE DETECTING DEVICE FOR ENGINE

TECHNICAL FIELD

The present disclosure relates to a misfire detecting device for an engine, and particularly to a misfire detecting device for an engine which includes a cylinder operation controlling module and a centrifugal damping part.

BACKGROUND OF THE DISCLOSURE

Conventionally, engine control devices are known, which include a plurality of cylinders, a valve stopping mechanism which, upon satisfaction of an execution condition of a reduced-cylinder operation in which operation of one or some of the plurality of cylinders are suspended, sets suspended cylinders from the plurality of cylinders and closes intake and exhaust valves of the suspended cylinders (e.g., among first to fourth cylinders, the first and fourth cylinders), and a controller which controls the valve stopping mechanism.

During the reduced-cylinder operation, by increasing an intake amount of the operating cylinders, an opening of a throttle valve is increased and a pumping loss is reduced. Therefore, a fuel consumption reducing effect can be expected.

Incidentally, when a misfire occurs in one of the operating cylinders during the reduced-cylinder operation, the number of operating cylinders which contribute to an engine output becomes less, and thus an engine speed significantly drops, which may cause an engine stop. Therefore, the reduced-cylinder operation is prohibited and an all-cylinder operation is resumed.

JP2006-132385A discloses an engine control device which includes a cylinder operation controlling module that switches an engine operation from an all-cylinder operation to a reduced-cylinder operation in which operation of one or some of the cylinders are suspended upon satisfaction of an execution condition of the reduced-cylinder operation, and a misfire detecting module which detects a misfire of the engine. When an engine speed drops more than a set value during the reduced-cylinder operation, the operation of the suspended cylinder(s) which reaches its ignition timing immediately after this engine speed drop is started to reliably prevent an engine stop due to a misfire.

Further, in a fluid transmission mechanism, such as an automatic transmission mechanism or a continuously variable transmission mechanism mounted on a vehicle, in order to reduce a torsional vibration of a drive system caused by a torque fluctuation of an engine, a centrifugal damper mechanism is used as a dynamic vibration absorber for attenuating the vibration.

As illustrated in FIG. 8A, the centrifugal damper mechanism which elastically deforms in its rotational direction to reduce vibration caused by a drive source when engaging a lockup clutch, is comprised of a plurality of damper springs 51 arranged on an outer circumferential side of the lockup clutch at an even interval in a circumferential direction of the centrifugal damper mechanism.

One circumferential end part of each damper spring 51 is directly supported by a receiving part 52a of a spring receiving member 52 extending radially outward from a clutch drum, and the other circumferential end part of the damper spring 51 is connected to a turbine hub and directly supported by a receiving part 53a of a spring retaining plate 53 for retaining an outer circumferential part of the damper spring.

Therefore, when torque is transmitted from the engine, a centrifugal force elastically deforms the damper spring 51 and moves the spring receiving member 52 in the rotational direction (see FIG. 8B).

However, with the misfire detecting device for the engine of JP2006-132385A, the misfire of the engine may erroneously be detected.

Normally, a misfire of an engine is detected based on an angular speed variation of the engine (crankshaft) according to a combustion stroke of each cylinder. Specifically, a number of times that the angular speed variation of the engine exceeds a given set value is counted and the misfire of the engine is detected when the count value exceeds a given threshold.

As a result of study, the present inventors found that, within a low engine load range in which the reduced-cylinder operation is performed, the output torque transmitted from the engine is low. Therefore, a so-called periodic movement phenomenon in which an elastically deforming speed of the damper spring 51 retained by the spring retaining plate 53 exceeds a rotational speed of the clutch drum and the circumferential end part of the damper spring 51 separates from the receiving part 52a of the spring receiving member 52 once and then collides therewith (see FIG. 8C) occurs, and this periodic movement phenomenon causes resonance of component(s) around the damper spring 51.

This resonance causes half-order vibration by the crankshaft similarly to the vibration caused by the angular speed variation of the engine when an actual misfire occurs, which results in detecting an angular speed variation larger than the set value similarly to when the engine misfire occurs. Thus, the engine misfire is erroneously detected even though it has not actually occurred.

SUMMARY OF THE DISCLOSURE

The purpose of the present disclosure is to provide a misfire detecting device for an engine, which avoids an erroneous detection of a misfire of the engine during a reduced-cylinder operation.

According to one aspect of the present disclosure, a misfire detecting device for an engine is provided, which includes a processor configured to execute a cylinder operation controlling module to switch an operation mode of the engine from an all-cylinder operation in which all of a plurality of cylinders of the engine are operated to a reduced-cylinder operation in which operation of one or some of the plurality of cylinders are suspended, when an execution condition of the reduced-cylinder operation is satisfied, and a misfire detecting module to detect a possibility of misfire occurrence based on an angular speed variation of the engine, and a centrifugal damping part to reduce vibration caused by the engine. When a possible misfire state where the misfire has the possibility of occurring is detected by the misfire detecting module during the reduced-cylinder operation, the cylinder operation controlling module executes an operating-cylinder increase control in which the number of operating cylinders is increased. When the possible misfire state is continuously detected after the operating-cylinder increase control, the misfire detecting module detects the misfire of the engine.

In the misfire detecting device, since the misfire detecting module which detects the misfire possibility based on the angular speed variation is provided, the misfire of the engine is detected by having a rotation behavior of a crankshaft as a parameter.

When the possible misfire state where there is the possibility of misfire is detected by the misfire detecting module during the reduced-cylinder operation, the cylinder operation controlling module executes the operating-cylinder increase control in which the number of operating cylinders is increased. Thus, a resonance accompanying a periodic movement phenomenon of the centrifugal damping part caused by the reduced-cylinder operation is prevented while avoiding an engine stop due to the misfire. When the possible misfire state is continuously detected after the operating-cylinder increase control, the misfire detecting module detects the misfire of the engine. Therefore, the misfire detecting module is able to reliably detect the actual misfire in the state where the resonance accompanying the periodic movement phenomenon is prevented.

When a number of times that the angular speed variation of the engine becomes larger than a set value exceeds a first threshold, the misfire detecting module may detect the possible misfire state and, when the number of times exceeds a second threshold that is set higher than the first threshold, the misfire detecting module may detect the misfire.

According to this configuration, the possible misfire state where there is the possibility of misfire is detected before the actual misfire detection.

When the possible misfire state is detected during the reduced-cylinder operation, the cylinder operation controlling module may return the operation mode to the all-cylinder operation and increase the number of operating cylinders.

According to this configuration, when the actual misfire occurs, the engine stop due to the misfire is avoided, and when the periodic movement phenomenon occurs, the resonance accompanying the periodic movement phenomenon is prevented.

When a cancelation of the possible misfire state is detected after the operating-cylinder increase control, the cylinder operation controlling module may return the operation mode to the reduced-cylinder operation.

According to this configuration, a fuel consumption reducing effect by the reduced-cylinder operation is secured.

After a given period of time from the detection of the cancelation of the possible misfire state after the operating-cylinder increase control, the cylinder operation controlling module may return the operation mode to the reduced-cylinder operation.

According to this configuration, the reduced-cylinder operation is started after a switching of a valve operating mechanism is completed.

The misfire detecting module may prohibit the detection of the misfire possibility for a given period of time from the operating-cylinder increase control.

According to this configuration, since the misfire detection is prohibited during the given period of time from the operating-cylinder increase control, an erroneous detection of the misfire in an unstable combustion state immediately after the operating-cylinder increase control is prevented.

According to another aspect of the present disclosure, a misfire detecting device for an engine is provided, which includes a centrifugal damper mechanism configured to reduce vibration caused by the engine, an angular speed sensor configured to detect an angular speed of a crankshaft of the engine, and a controller configured to execute a cylinder operation switching module configured to switch an operation mode of the engine from an all-cylinder operation in which all of a plurality of cylinders of the engine are operated to a reduced-cylinder operation in which operation of one or some of the plurality of cylinders are suspended, when an execution condition of the reduced-cylinder operation is satisfied, and detect a misfire of the engine based on a variation in the angular speed detected by the angular speed sensor. When the number of times that the variation in the angular speed detected by the angular speed sensor becomes larger than a set value during the reduced-cylinder operation exceeds a first threshold, the controller executes an operating-cylinder increase control in which the number of operating cylinders is increased. When the number of times that the variation in the angular speed detected by the angular speed sensor becomes larger than the set value exceeds a second threshold that is set higher than the first threshold after the operating-cylinder increase control, the controller detects the misfire of the engine.

After the operating-cylinder increase control, when the variation in the angular speed detected by the angular speed sensor falls below the set value, the controller may return the operation mode to the reduced-cylinder operation.

DETAILED DESCRIPTION OF THE DISCLOSURE

Hereinafter, one embodiment of the present disclosure is described in detail with reference to the accompanying drawings.

The following description exemplifies a case where the present disclosure is applied to a powertrain of a vehicle and is not to limit the present disclosure, an application thereof, or a usage thereof.

First Embodiment

Hereinafter, a first embodiment of the present disclosure is described with reference to FIGS. 1 to 7.

Figure 1:
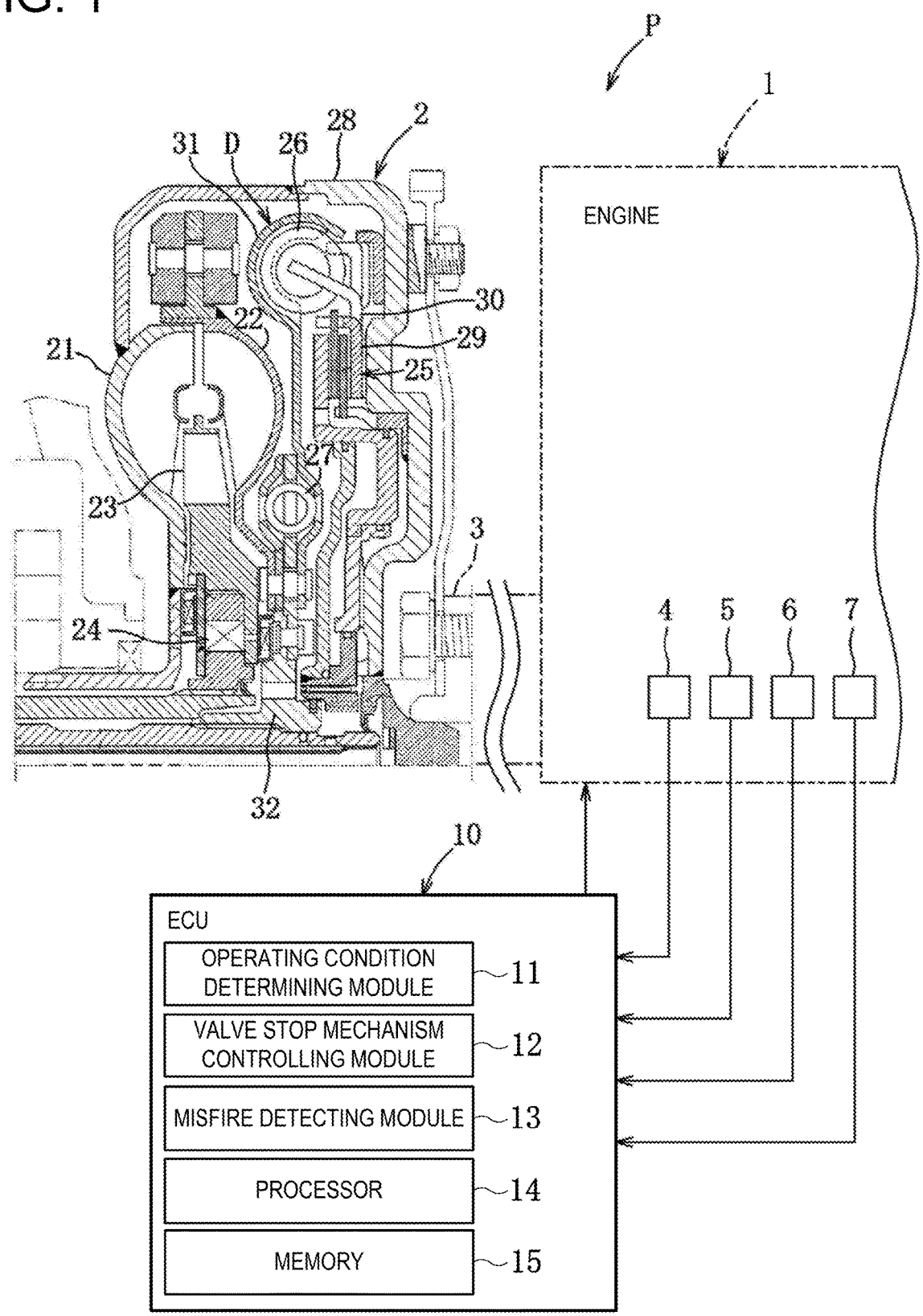
FIG. 1 is a partial cross-sectional view illustrating an overall configuration of a powertrain according to a first embodiment.

As illustrated in FIG. 1, a powertrain P of this embodiment includes an engine 1 as an internal combustion engine, a torque converter 2 as a fluid transmission mechanism (automatic transmission mechanism), and an ECU (Electric Control Unit, also referred to as a controller) 10 which performs a control of the engine 1 and a misfire detection of the engine 1.

This engine 1 is a cylinder deactivatable engine formed with first to fourth cylinders arranged in line, and suitably switchable of an operation mode between an operation in which two of the four cylinders are suspended while the remaining two cylinders are operated (i.e., a reduced-cylinder operation), and an operation in which all the four cylinders are operated (i.e., an all-cylinder operation).

First, the engine 1 is described.

The engine 1 is provided, for each cylinder, with an intake valve (not illustrated) which supplies intake air into a combustion chamber (not illustrated), a fuel injector (not illustrated) which injects fuel toward the combustion chamber, an ignition plug (not illustrated) which ignites a mixture gas containing air and fuel, a reciprocatable piston (not illustrated), a crankshaft 3 which rotates by the reciprocation of the piston, a crankcase (not illustrated) accommodating the crankshaft 3, an exhaust valve (not illustrated) which discharges exhaust gas generated by combustion of the mixture gas inside the combustion chamber to an exhaust passage (not illustrated), etc. The ignition is performed in order of the first cylinder, the third cylinder, the fourth cylinder, and the second cylinder.

The engine 1 is provided with an opening sensor 4 which detects an opening of a throttle valve of the engine 1, an engine speed sensor 5 which detects a speed of the engine 1, a torque sensor 6 which detects an output torque of the engine 1, and an angular speed sensor 7 which detects a rotational angular speed of the crankshaft 3. Measurement values of the respective sensors are outputted to the ECU 10.

Next, the torque converter 2 will be described.

As illustrated in FIG. 1, the torque converter 2 is entirely connected to the crankshaft 3 via a crank bolt, and is driven by the engine 1.

The torque converter 2 includes a pump 21, a turbine 22, a stator 23, a one-way clutch 24, a lock-up clutch 25, a plurality of damper springs 26, a plurality of damper springs 27, a casing 28 accommodating these components, and a centrifugal damper mechanism D (centrifugal damping part). The casing 28 is filled with oil which is fluid for power transmission.

The damper springs 26 and 27 elastically deform in a rotational direction of the torque converter 2 to reduce vibration caused by the engine 1 (crankshaft 3) when engaging the lockup clutch 25.

Figure 2:
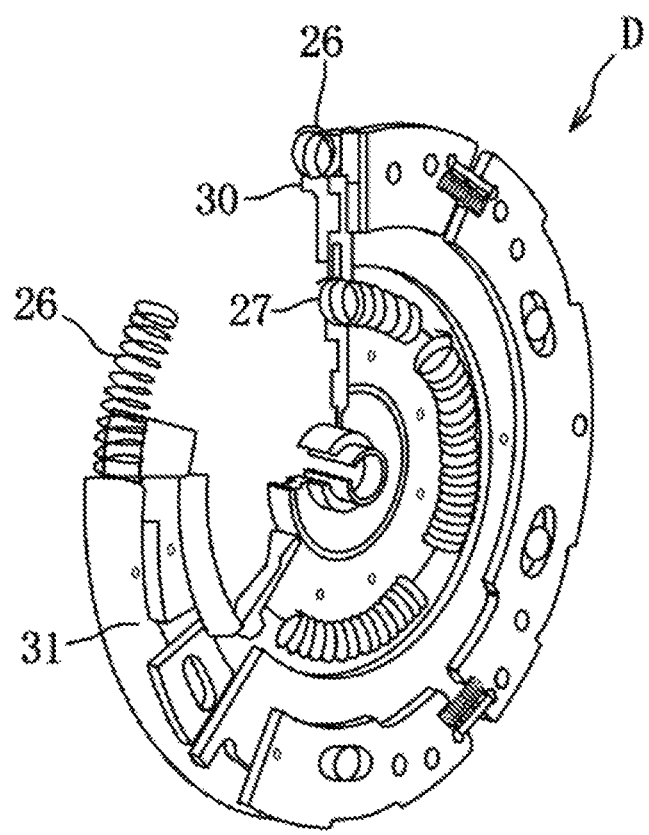
FIG. 2 is a perspective view of a centrifugal damper mechanism.

As illustrated in FIG. 2, the plurality of damper springs 26 and the plurality of damper springs 27 are respectively arranged at even intervals in a circumferential direction of the centrifugal damper mechanism D, and are provided to overlap with each other in an axial direction of the centrifugal damper mechanism D.

As illustrated in FIG. 1, one circumferential end part of each damper spring 26 is directly supported by a receiving part of a spring receiving member 30 integrally formed with a clutch drum 29 and extending radially outward from the clutch drum 29, and the other circumferential end part of the damper spring 26 is directly supported by a receiving part of a spring retaining plate 31 covering an outer circumference of the damper spring 26.

The spring retaining plate 31 is connected at its inner circumferential end part to a turbine hub 32 via a rivet so as to be elastically movable in the rotational direction via the spring receiving member 30 and the damper spring 26. Thus, when engaging the lockup clutch 25, the rotation of the crankshaft 3 is inputted to the spring receiving member 30 via the lockup clutch 25, and transmitted to the spring retaining plate 31 (turbine hub 32) via the damper spring 26.

The damper springs 27 are provided to a radially medium part of the spring retaining plate 31 and have a higher torsion spring durability than the damper springs 26. Thus, a torsional operating angle may be widened and the vibration of the drive system caused by a torque fluctuation of the engine 1 is attenuated.

Therefore, the damper springs 26 and 27, the spring receiving member 30, the spring retaining plate 31, etc. constitute the centrifugal damper mechanism D.

Next, the ECU 10 will be described.

When an execution condition of the all-cylinder operation is satisfied, the ECU 10 performs the all-cylinder operation of the first to fourth cylinders, and, when an execution condition of the reduced-cylinder operation is satisfied, the ECU 10 stops the operation of the first and fourth cylinders and performs the reduced-cylinder operation by the second and third cylinders.

Further, the ECU 10 detects a possibility of misfire occurrence for each cylinder based on an angular speed variation of the crankshaft 3 and, when the occurrence of the misfire of the engine 1 is detected, it performs the all-cylinder operation.

The ECU 10 is comprised of a processor 14 (i.e., a CPU (Central Processing Unit)), memory 15 (i.e., ROM(s) and RAM(s)), an input-side interface, an output-side interface.

As illustrated in FIG. 1, the ECU 10 includes an operating condition determining module 11, a valve stop mechanism controlling module 12 (cylinder operation controlling module, cylinder operation switching module), and a misfire detecting module 13 (misfire detecting module). The processor 14 is configured to execute the operating condition determining module 11, the valve stop mechanism controlling module 12, and the misfire detecting module 13 to perform their respective functions. These modules are stored in the memory 15 as one or more software programs.

Based on an operating state of the engine 1, the operating condition determining module 11 determines the operation mode to be performed, between the all-cylinder operation and the reduced-cylinder operation.

Figure 3:
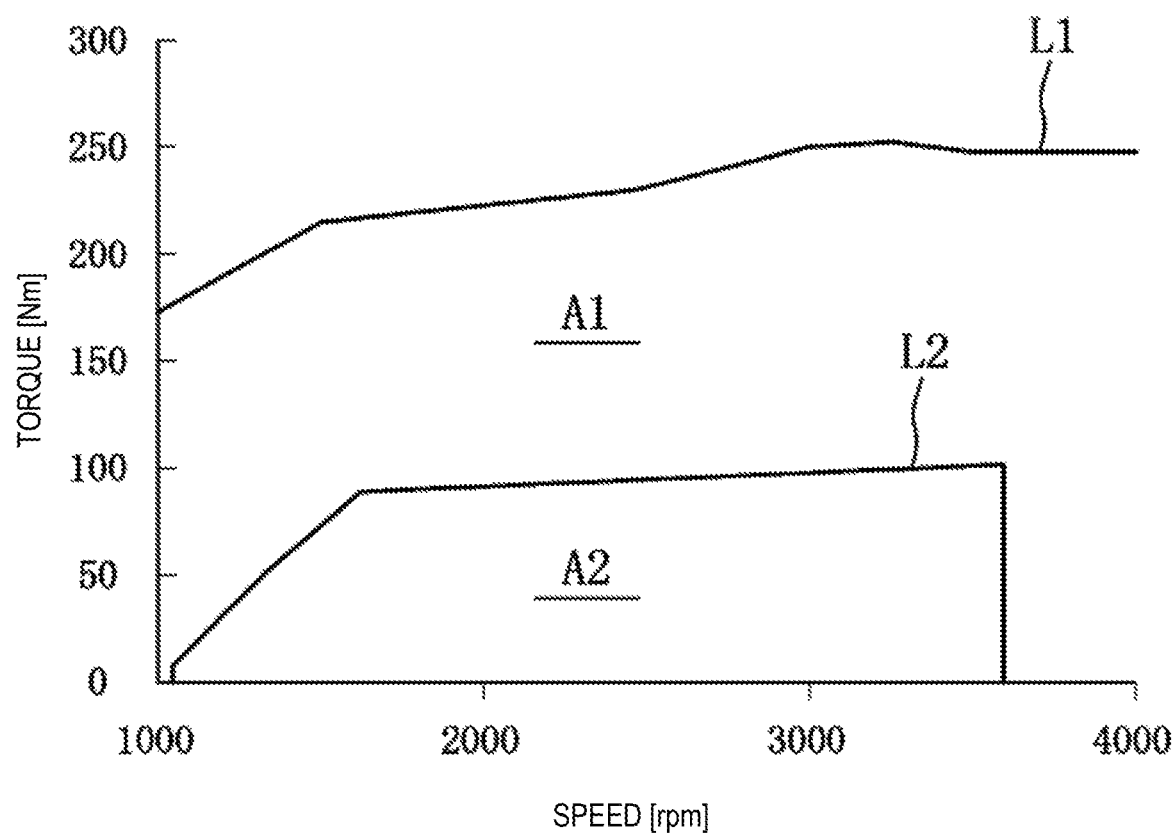
FIG. 3 is a map in which an all-cylinder operating range and a reduced-cylinder operating range are set.

As illustrated in FIG. 3, the operating condition determining module 11 stores a map in which an all-cylinder operating range A1 defined by an upper-limit torque line L1 (corresponding to a fully opened state of the throttle valve) and a reduced-cylinder operating range A2 covering a low torque segment of the all-cylinder operating range A1, and it determines which operation mode the satisfied execution condition meets, based on this map and the measurement values of the respective sensors 5 and 6.

The reduced-cylinder operating range A2 is set to cover from low to high engine speeds, and an upper-limit torque line L2 thereof, having a positive inclination at a low engine speed side, is set based on a highest torque, a loss range branching torque, an intake pulsation restriction, etc. during the reduced-cylinder operation.

The valve stop mechanism controlling module 12 switches the execution of the all-cylinder operation and the reduced-cylinder operation therebetween based on the determination result of the operating condition determining module 11. For example, during the all-cylinder operation, the open/close operation of the intake and exhaust valves of the first to fourth cylinders is allowed, whereas during the reduced-cylinder operation, hydraulic pressure supplied to hydraulic lash adjusters (HLAs; not illustrated) of the first and fourth cylinders is held at a given level for keeping a closed state so that the intake and exhaust valves of the suspended cylinders are kept closed.

The valve stop mechanism controlling module 12 corrects the opening of the throttle valve by increasing it and prohibits the operation of the fuel injectors of the first and fourth cylinders so that a total torque (required torque)

outputted from the engine 1 during the reduced-cylinder operation becomes substantially constant.

Within a low torque range, such as during the reduced-cylinder operation, a periodic movement phenomenon in which the other circumferential end part of the damper spring 26 separates from the receiving part of the spring receiving member 30 once and then collides therewith may occur. Resonance accompanying this periodic movement phenomenon causes half-order vibration by the crankshaft 3 similarly to the vibration caused by an angular speed variation $\Delta\omega$ when an actual misfire of the engine 1 occurs. Thus, the engine misfire may erroneously be detected even though it has not actually occurred.

Therefore, when a possible misfire state is detected during the reduced-cylinder operation, the valve stop mechanism controlling module 12 returns the operation mode to the all-cylinder operation, and when a cancelation of the possible misfire state is detected after resuming to the all-cylinder operation, the valve stop mechanism controlling module 12 returns the operation mode to the reduced-cylinder operation. Thus, when the possible misfire state is detected due to the resonance accompanying the periodic movement phenomenon, the periodic movement phenomenon may be resolved by returning to the all-cylinder operation, and the occurrence of the resonance accompanying the periodic movement phenomenon is prevented. Further, when the cancelation of the possible misfire state is detected after resuming to the all-cylinder operation, the actual misfire is considered as not occurred, and thus, the operation mode is resumed to the reduced-cylinder operation promptly and a fuel consumption is reduced.

Moreover, the valve stop mechanism controlling module 12 returns the operation mode to the reduced-cylinder operation after a given period of time (e.g., 3 secs) from the detection of the cancelation of the possible misfire state after resuming to the all-cylinder operation. Thus, the reduced-cylinder operation is started after switching of a valve operating mechanism is reliably completed.

During a given measurement time, based on the measurement value of the angular speed sensor 7 which detects the rotational angular speed of the crankshaft 3, the misfire detecting module 13 counts a number of times that a negative angular speed variation $\Delta\omega$ becomes larger than a given set value $\alpha$ (misfire count value C).

Once the counted value C exceeds a first threshold N1, the misfire detecting module 13 determines that the engine is in the possible misfire state (detects the possible misfire state), and once the value C exceeds a second threshold N2 (N1<N2), it determines that the misfire has occurred (detects the misfire).

If the possible misfire state is detected, a possible misfire detection flag F1 is set to 1, if the misfire is detected, a failure detection flag F2 is set to 1, and normally, both the flags F1 and F2 are set to 0. Note that the values of the flags F1 and F2 are continuously saved as latest history information.

Further, the misfire detecting module 13 may prohibit the detection of the misfire possibility for a given period of time (e.g., while the ignition plug ignites 16 times) after resuming the all-cylinder operation. Thus, the misfire detection of the engine 1 is performed after the switching of the valve operating mechanism is reliably completed.

Next, processing contents of a cylinder operation control will be described based on the flowchart of FIG. 4.

Note that Si (i=1, 2, . . . ) indicates a step for each processing.

Figure 4:
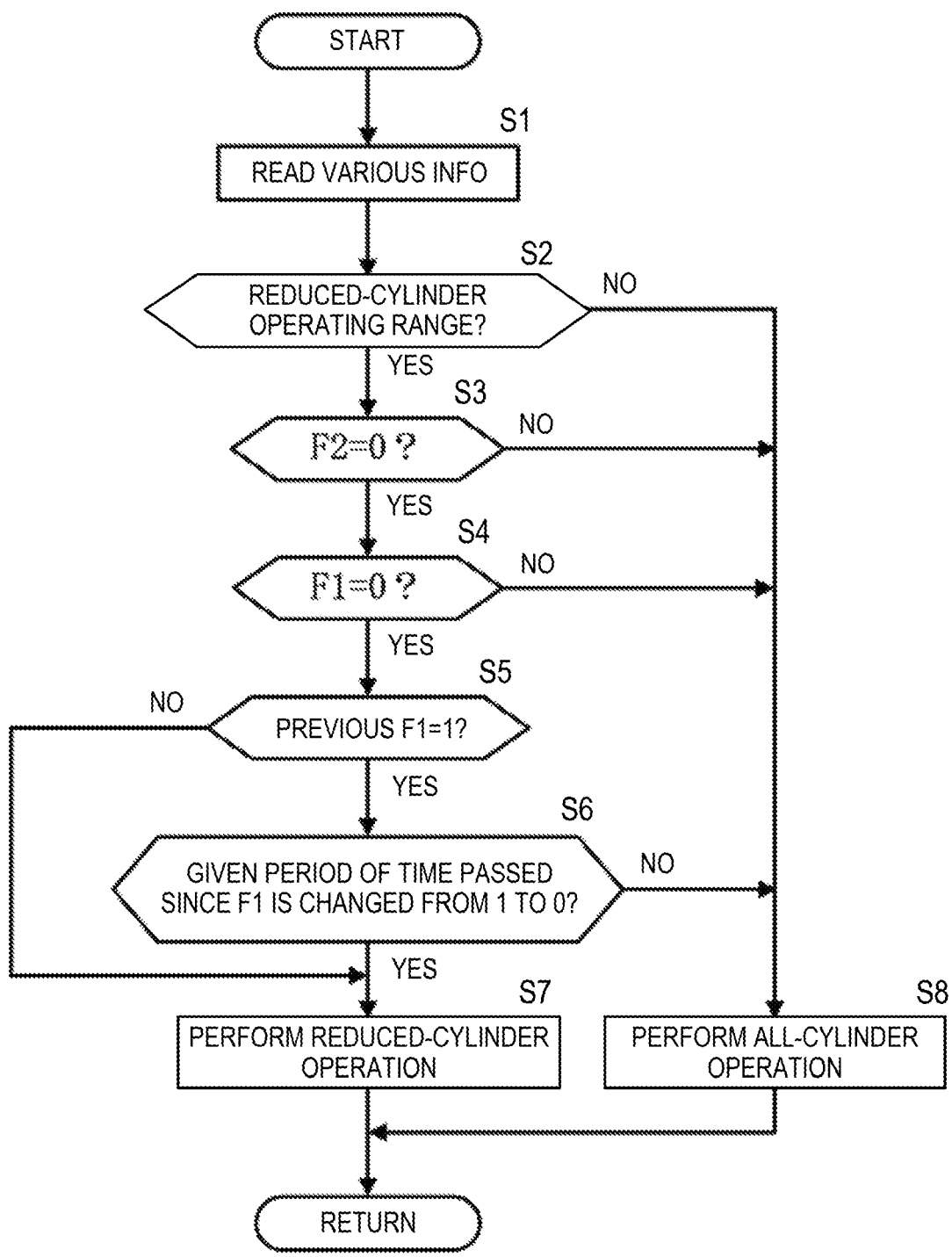
FIG. 4 is a flowchart illustrating processing contents of a cylinder-operation control.

As illustrated in the flowchart of FIG. 4, first at 51, the outputs of the sensors 4 to 7, the map and various information are read and the process proceeds to S2.

At S2, whether or not the operating state is within the reduced-cylinder operating range A2 is determined.

If the operating state is within the reduced-cylinder operating range A2 as a result of the determination of S2, the process proceeds to S3.

If the operating state is not within the reduced-cylinder operating range A2 as the result of the determination of S2, this means it is within the all-cylinder operating range A1, and therefore, the process shifts to S8.

At S3, whether or not the failure detection flag F2 is 0 is determined.

If the failure detection flag F2 is 0 as a result of the determination at S3, since the actual misfire has not occurred, the process shifts to S4. If the failure detection flag F2 is not 0 as the result of the determination at S3, since the actual misfire is detected, the process shifts to S8 to perform the all-cylinder operation.

At S4, whether or not the possible misfire detection flag F1 is 0 is determined.

If the possible misfire detection flag F1 is 0 as a result of the determination at S4, since it is not in the possible misfire state, the process shifts to S5.

At S5, whether the possible misfire detection flag F1 was 1 in the previous determination is determined.

If the possible misfire detection flag F1 was 1 in the previous determination as a result of the determination at S5, since the cancelation of the possible misfire state by the all-cylinder operation is determined, the process shifts to S6.

At S6, whether a given period of time has passed since the possible misfire detection flag F1 is changed from 1 to 0 is determined.

If the given period of time has passed from the change of the possible misfire detection flag F1 from 1 to 0 as a result of the determination at S6, since the switching of the valve operating mechanism is reliably completed, the reduced-cylinder operation is performed (S7), and the process returns.

If the given period of time has not passed from the possible misfire detection flag F1 from 1 to 0 as the result of the determination at S6, although the periodic movement phenomenon is resolved, since whether the switching of the valve operating mechanism is completed is uncertain, the all-cylinder operation is continued (S8), and the process returns.

If the possible misfire detection flag F1 was not 1 in the previous determination as the result of the determination at S5, since the possible misfire state is not determined continuously to the previous determination, the process shifts to S7.

If the possible misfire detection flag F1 is not 0 as the result of the determination at S4, since the engine is in the possible misfire state, the process shifts to S8 to perform the all-cylinder operation.

Next, processing contents of the misfire detection will be described based on the flowchart of FIG. 5.

Note that the misfire detection processing is repeated at a given cycle by the misfire detecting module 13 and is performed in parallel with the cylinder operation control processing illustrated in FIG. 4. That is, the possible misfire detection flag F1 and the failure detection flag F2 are determined as needed while the cylinder operation control processing is performed.

Figure 5:
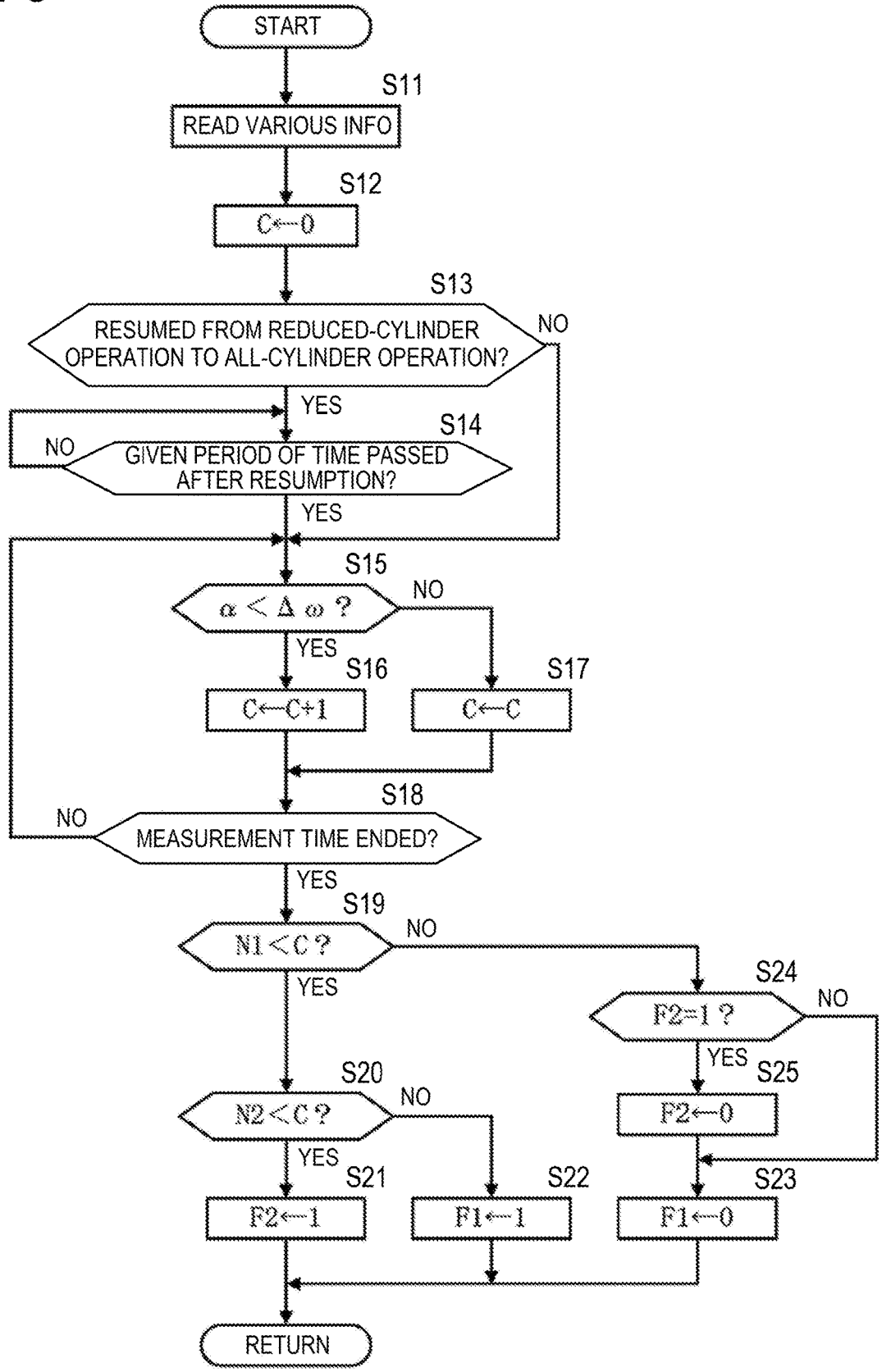
FIG. 5 is a flowchart illustrating processing contents of a misfire detection.

As illustrated in the flowchart of FIG. 5, first at S11, the outputs of the sensors 4 to 7 and various information are read, the misfire count value C is reset to 0 (S12) and the process shifts to S13.

At S13, whether or not the operation mode has resumed from the reduced-cylinder operation to the all-cylinder operation is determined.

If the operation mode has resumed from the reduced-cylinder operation to the all-cylinder operation as a result of the determination of S13, the process shifts to S14, and if the operation mode has not resumed from the reduced-cylinder operation to the all-cylinder operation as the result of the determination of S13, the process shifts to S15.

At S14, whether or not a given period of time has passed after the resumption from the reduced-cylinder operation to the all-cylinder operation is determined.

If the given period of time has passed after the resumption from the reduced-cylinder operation to the all-cylinder operation as a result of the determination of S14, the process shifts to S15, and if the given period of time has not passed after the resumption from the reduced-cylinder operation to the all-cylinder operation as the result of the determination of S14, the determination is continued until the given period of time passes.

At S15, whether the angular speed variation $\Delta\omega$ is larger than the set value $\alpha$ is determined.

If the angular speed variation $\Delta\omega$ is larger than the set value $\alpha$ as a result of the determination of S15, the value C is set to C+1 (S16) and the process shifts to S18, and if the angular speed variation $\Delta\omega$ is smaller than the set value $\alpha$ as the result of the determination of S15, the value C is maintained as it is (S17) and the process shifts to S18.

At S18, whether or not the measurement time is ended is determined.

If the measurement time is ended as a result of the determination of S18, the process shifts to S19. If the measurement time is not ended as the result of the determination of S18, the measurement is continued until the measurement time ends.

At S19, whether or not the value C exceeds the first threshold N1 is determined.

If the value C exceeds the first threshold N1 as a result of the determination of S19, the process shifts to S20.

At S20, whether the value C exceeds the second threshold N2 is determined.

If the value C exceeds the second threshold N2 as a result of the determination of S20, the failure detection flag F2 is set to 1 (S21) and the process returns.

If the value C is smaller than the second threshold N2 as the result of the determination of S20, the possible misfire detection flag F1 is set to 1 (S22) and the process returns.

If the value C is smaller than the first threshold N1 as the result of the determination of S19, the process shifts to S24 where whether the failure detection flag F2 is 1 is determined.

If the failure detection flag F2 is 1 as a result of the determination of S24, since the actual misfire is resolved, the failure detection flag F2 is set to 0 (S25) and the process shifts to S23.

If the failure detection flag F2 is not 1 as the result of the determination of S24, the process shifts to S23.

At S23, the possible misfire detection flag F1 is set to 0 and the process returns.

Next, the state of the engine 1 when the resonance occurs and when the actual misfire occurs will be described based on the time charts of FIGS. 6 and 7.

First, the engine state when the resonance occurs is described.

Figure 6:
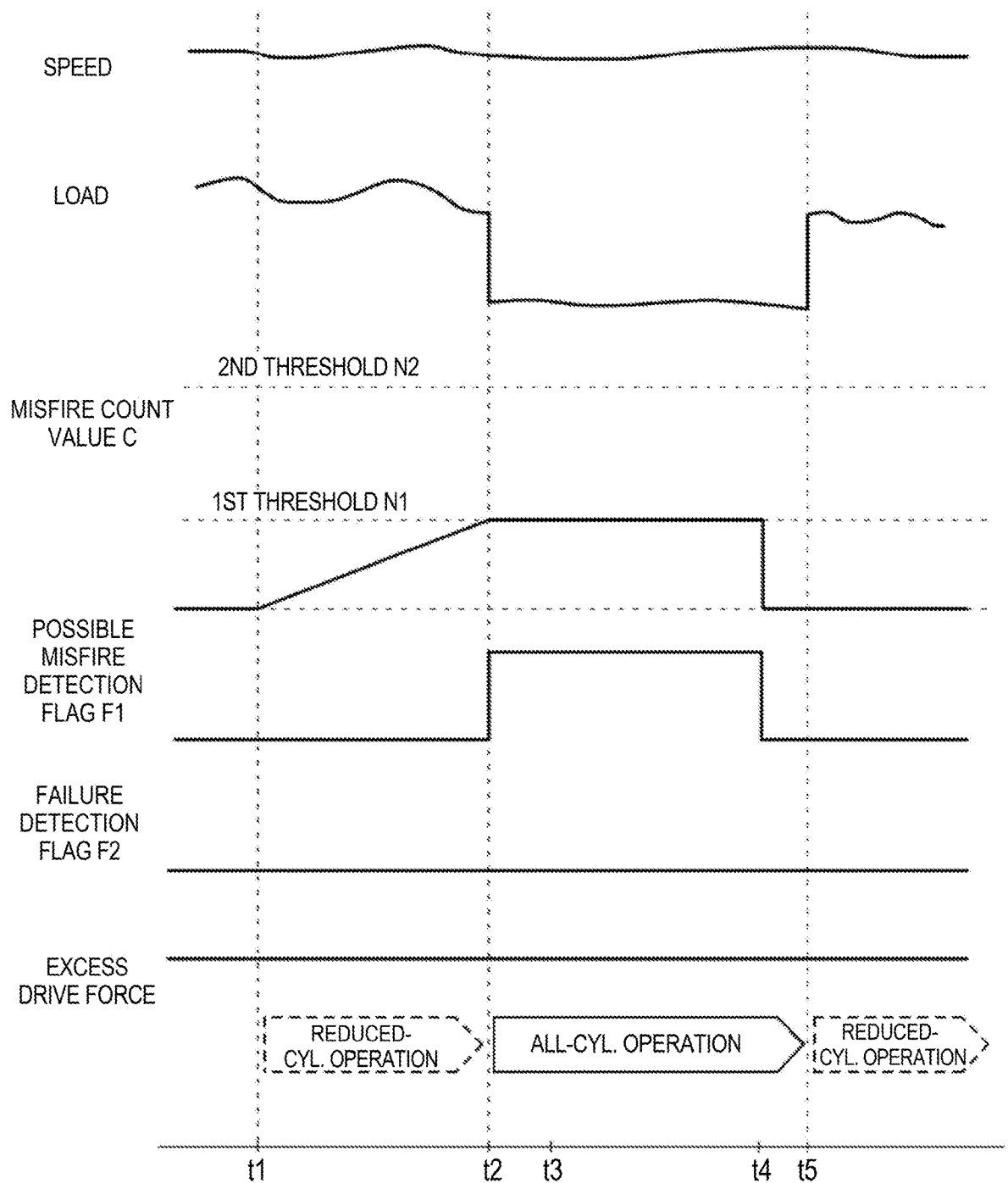
FIG. 6 is a time chart for when resonance occurs.

As illustrated in FIG. 6, during the reduced-cylinder operation, after a timing t1 at which the resonance occurs, the misfire count value C gradually increases. At this timing, the possible misfire detection flag F1 and the failure detection flag F2 are both 0. At a timing t2 at which the value C exceeds the first threshold N1, the possible misfire detection flag F1 is set to 1 and the all-cylinder operation is started (resumed).

The counting of misfire is prohibited (the misfire state detection is prohibited) until the period of time corresponding to the 16 times of ignitions passes from the all-cylinder operation resumption (t3). After t3, since the torque outputted from the engine 1 increases and the resonance accompanying the periodic movement phenomenon is resolved, the value C decreases, and the possible misfire detection flag F1 is set to 0 (t4). After 3 secs from the setting of the possible misfire detection flag F1 to 0 (t5), the reduced-cylinder operation is resumed.

Next, the engine state when the actual misfire occurs will be described.

Figure 7:
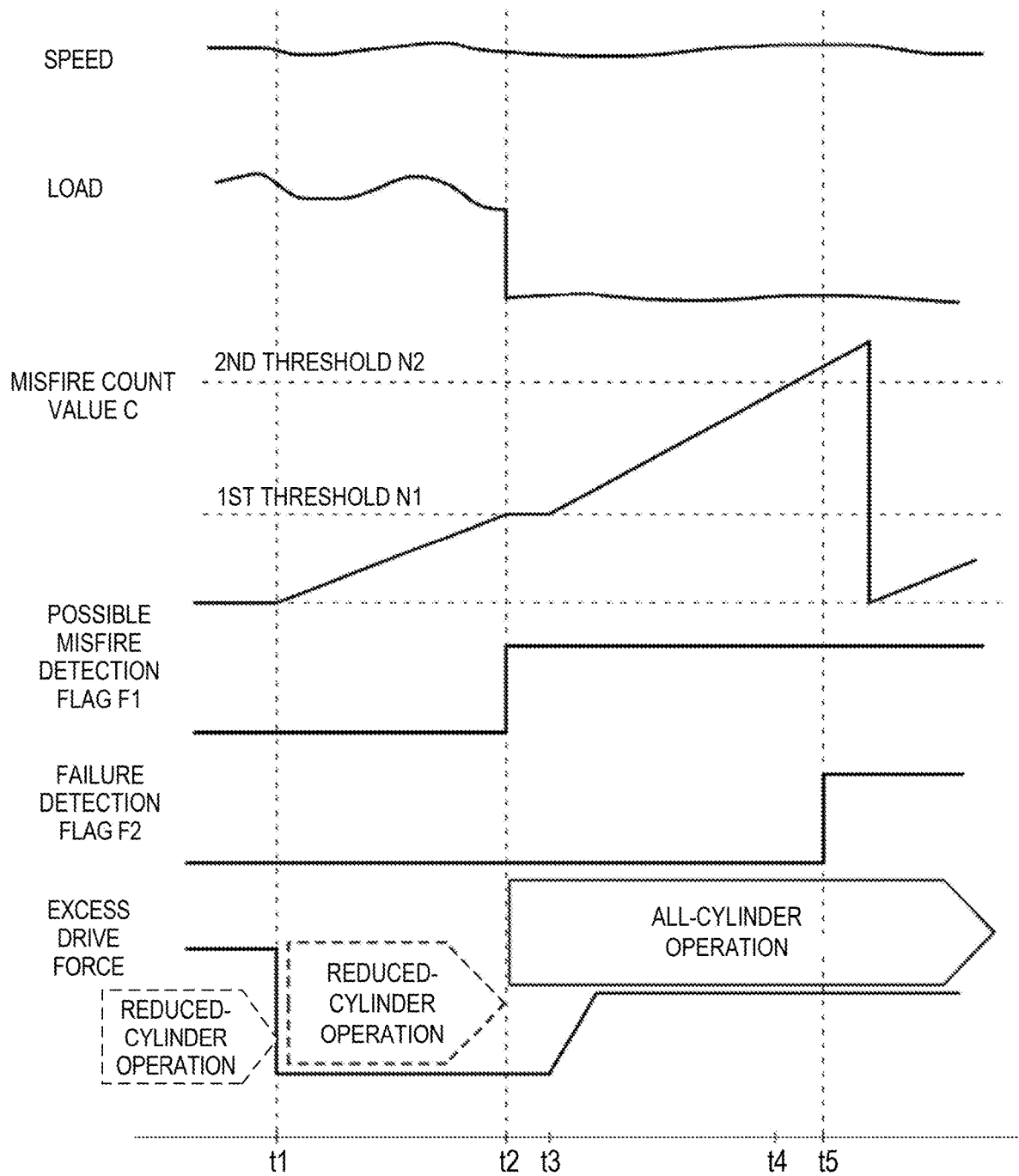
FIG. 7 is a time chart for when an actual misfire occurs.
Figure 8A:
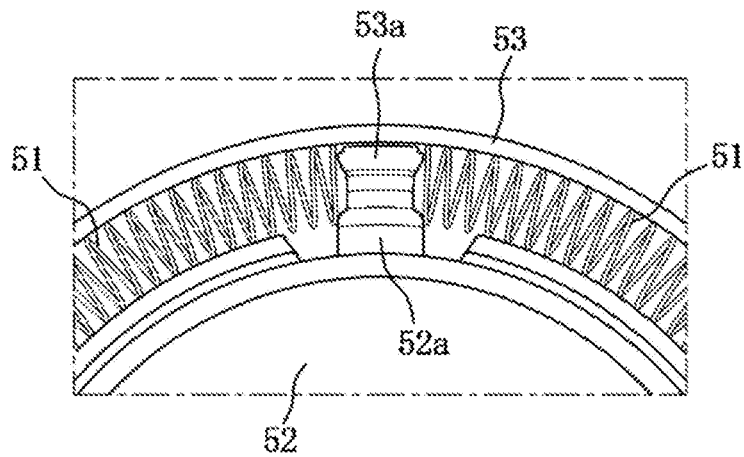
FIGS. 8A to 8C are enlarged views of a substantial part of the centrifugal damper mechanism, in which FIG. 8A indicates an initial state, FIG. 8B indicates a normal operating state, and FIG. 8C indicates an operating state when a periodic movement phenomenon occurs.
Figure 8B:
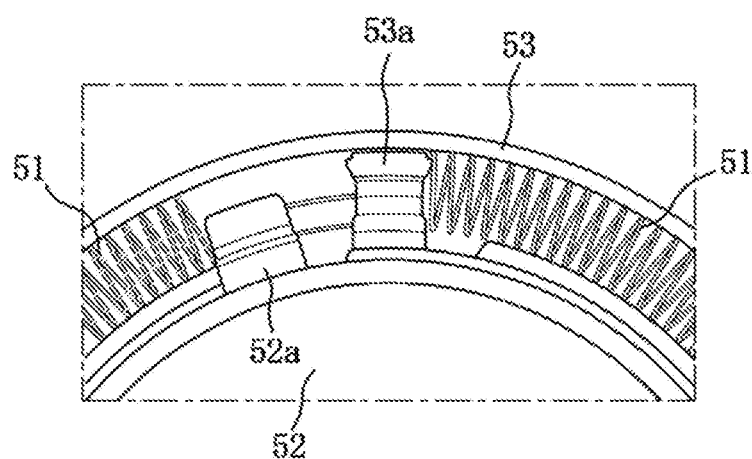
Figure 8C:
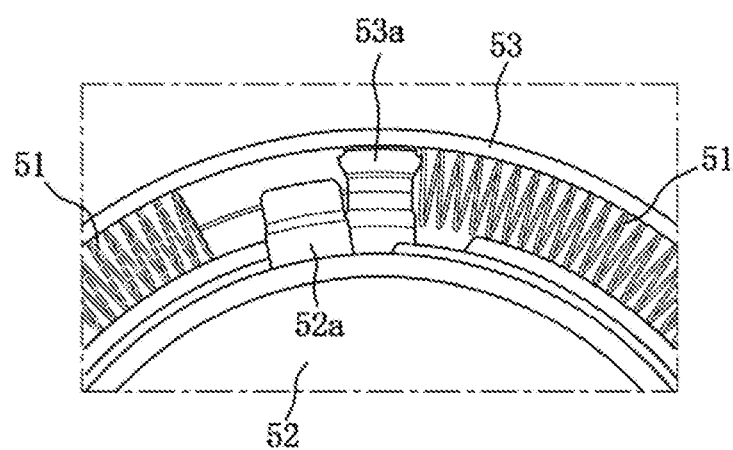

As illustrated in FIG. 7, during the reduced-cylinder operation, after the timing t1 at which the actual misfire occurs, the misfire count value C gradually increases. At this timing, the possible misfire detection flag F1 and the failure detection flag F2 are both 0. At the timing t2 at which the value C exceeds the first threshold N1, the possible misfire detection flag F1 is set to 1 and the all-cylinder operation is started. Since the counting of misfire is prohibited until the period of time corresponding to the 16 times of ignitions passes from the all-cylinder operation resumption (t3), the value C is maintained.

After t3, since the misfire state detection is started and the value C increases, the value C exceeds the second threshold N2. Note that since the possible misfire detection flag F1 is not set to 0, the all-cylinder operation is continuously performed after t5.

Next, the operations and effects of the misfire detecting device for the engine will be described.

According to this misfire detecting device, since the misfire detecting module 13 which detects the misfire possibility based on the angular speed variation $\Delta\omega$ is provided, the misfire of the engine 1 is detected by having the rotation behavior of the crankshaft 3 as a parameter.

When the possible misfire state where there is the possibility of misfire is detected by the misfire detecting module 13 during the reduced-cylinder operation, the valve stop mechanism controlling module 12 executes an operating-cylinder increase control in which the number of operating cylinders is increased. Thus, the resonance accompanying the periodic movement phenomenon of the centrifugal damper mechanism D caused by the reduced-cylinder operation is prevented while avoiding the engine stop due to the misfire. When the possible misfire state is continuously detected after the operating-cylinder increase, the misfire detecting module 13 detects the misfire of the engine 1. Therefore, the misfire detecting module 13 is able to reliably detect the actual misfire in the state where the resonance accompanying the periodic movement phenomenon is prevented.

The misfire detecting module 13 detects the possible misfire state when the number of times C that the angular speed variation $\Delta\omega$ becomes larger than the set value $\alpha$ exceeds the first threshold N1, and detects the misfire of the engine 1 when the value C exceeds the second threshold N2 which is set larger than the first threshold N1. Therefore, the possible misfire state where there is a possibility of misfire is detected before the actual misfire detection.

The valve stop mechanism controlling module 12 returns the operation mode to the all-cylinder operation when the possible misfire state is detected during the reduced-cylinder operation. Therefore, when the actual misfire occurs, the engine stop due to the misfire is avoided, and when the periodic movement phenomenon occurs, the resonance accompanying the periodic movement phenomenon is prevented.

Since the valve stop mechanism controlling module 12 returns the operation mode to the reduced-cylinder operation when the cancelation of the possible misfire state is detected after the operating-cylinder increase, the fuel consumption reducing effect by the reduced-cylinder operation is secured.

Since the valve stop mechanism controlling module 12 returns the operation mode to the reduced-cylinder operation after the given period of time from the detection of cancelation of the possible misfire state after the operating-cylinder increase, the reduced-cylinder operation is started after the switching of the valve operating mechanism is completed.

Since the misfire detecting module 13 prohibits the detection of the misfire possibility during the given period of time after the operating-cylinder increase, that is, the misfire detection is prohibited during this given period of time, the erroneous detection of the misfire in an unstable combustion state immediately after the operating-cylinder increase is prevented.

Next, modifications in which the above embodiment is partially modified will be described.

(1) Although in the above embodiment the example of the inline four-cylinder engine is described, the application is not particularly limited to this engine, and may be to any type of engines without limitation, such as a six-cylinder engine or a V-type engine.

Further, although the example of the engine which performs the reduced-cylinder operation in which the operation of two (half) of the four cylinders are suspended is described, the number of suspended cylinders may arbitrarily be set.

(2) In the above embodiment the example of the centrifugal damper mechanism comprised of the damper spring, the spring receiving member and the spring holding plate is described. However, any mechanism may be applied as long as it has a weight, material and structure which causes the half-order vibration by the crankshaft due to resonance accompanying the periodic movement phenomenon, similarly to the vibration caused by the angular speed variation of the engine when the actual misfire occurs, and it is not limited to the configuration of the above embodiment.

(3) Although in the above embodiment the example in which the single angular speed sensor provided to the crankshaft is used to measure the misfire possibility for the four cylinders is described, the angular speed sensor may be provided to each cylinder.

Further, a differential value of a measurement value of a rotational angle sensor may be used instead of that of the angular speed sensor.

(4) Although in the above embodiment the example in which the operation mode is returned to the reduced-cylinder operation after 3 secs from the detection of cancelation of the possible misfire state after resuming to the all-cylinder operation is described, a suitable period of time may be set according to the specifications of the engine.

Further, although the example in which the detection of the misfire possibility is prohibited while the ignition plug ignites 16 times after resuming to the all-cylinder operation is described, a suitable period of time may similarly be set according to the specifications of the engine.

(5) Additionally, those skilled in the art can implement the above embodiment and modifications with an addition of various changes or by combining them with each other without departing from the scope of the present disclosure, and the present disclosure also includes such modifications.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
12 Valve Stop Mechanism Controlling Module
13 Misfire Detecting Module
26, 27 Damper Spring
30 Spring Receiving Member
31 Spring Retaining Plate
D Centrifugal Damper Mechanism

What is claimed is:

1. A misfire detecting device for an engine, comprising:
a processor configured to execute:
 a cylinder operation controlling module to switch an operation mode of the engine from an all-cylinder operation in which all of a plurality of cylinders of the engine are operated to a reduced-cylinder operation in which operation of one or some of the plurality of cylinders are suspended, when an execution condition of the reduced-cylinder operation is satisfied; and
 a misfire detecting module to detect a possibility of misfire occurrence based on an angular speed variation of the engine; and
 a centrifugal damper to reduce vibration caused by the engine, wherein
 if a possible misfire state where the possibility of misfire occurrence is detected by the misfire detecting module during the reduced-cylinder operation, the cylinder operation controlling module executes an operating-cylinder increase control in which a number of operating cylinders is increased, and
 if the possible misfire state is continuously detected after the operating-cylinder increase control, the misfire detecting module detects a misfire of the engine.

2. The misfire detecting device of claim 1, wherein when a number of times that the angular speed variation of the engine becomes larger than a set value exceeds a first threshold, the misfire detecting module detects the possible misfire state and, when the number of times exceeds a second threshold that is set higher than the first threshold, the misfire detecting module detects the misfire.

3. The misfire detecting device of claim 1, wherein when the possible misfire state is detected during the reduced-cylinder operation, the cylinder operation controlling module returns the operation mode to the all-cylinder operation and increases the number of operating cylinders.

4. The misfire detecting device of claim 1, wherein when a cancelation of the possible misfire state is detected after the operating-cylinder increase control, the cylinder operation controlling module returns the operation mode to the reduced-cylinder operation.

5. The misfire detecting device of claim 4, wherein after a given period of time from detection of the cancelation of the possible misfire state after the operating-cylinder increase control, the cylinder operation controlling module returns the operation mode to the reduced-cylinder operation.

6. The misfire detecting device of claim 1, wherein the misfire detecting module prohibits the detection of the possibility of misfire occurrence for a given period of time after the operating-cylinder increase control.

7. A misfire detecting device for an engine, comprising:
a centrifugal damper configured to reduce vibration caused by the engine;
an angular speed sensor configured to detect an angular speed of a crankshaft of the engine; and
a controller configured to:
execute a cylinder operation switching module to switch an operation mode of the engine from an all-cylinder operation in which all of a plurality of cylinders of the engine are operated to a reduced-cylinder operation in which operation of one or some of the plurality of cylinders are suspended, when an execution condition of the reduced-cylinder operation is satisfied; and
detect a misfire of the engine based on a variation in the angular speed detected by the angular speed sensor, wherein
if the number of times that the variation in the angular speed detected by the angular speed sensor becomes larger than a set value during the reduced-cylinder operation exceeds a first threshold, the controller executes an operating-cylinder increase control in which a number of operating cylinders is increased, and
if the number of times that the variation in the angular speed detected by the angular speed sensor becomes larger than the set value exceeds a second threshold after the operating-cylinder increase control, the controller detects the misfire of the engine, the second threshold being set higher than the first threshold.

8. The misfire detecting device of claim 7, wherein after the operating-cylinder increase control, when the variation in the angular speed detected by the angular speed sensor falls below the set value, the controller returns the operation mode to the reduced-cylinder operation.

* * * * *